(12) United States Patent
Guo et al.

(10) Patent No.: US 10,143,225 B2
(45) Date of Patent: Dec. 4, 2018

(54) METHODS FOR REDUCING OIL AND/OR FAT UPTAKE OF FRIED FOODS

(71) Applicant: DOW GLOBAL TECHNOLOGIES LLC, Midland, MI (US)

(72) Inventors: Jing Guo, Midland, MI (US); Jorg Theuerkauf, Lake Jackson, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 541 days.

(21) Appl. No.: 14/422,369

(22) PCT Filed: Sep. 23, 2013

(86) PCT No.: PCT/US2013/061116
§ 371 (c)(1),
(2) Date: Feb. 19, 2015

(87) PCT Pub. No.: WO2014/052217
PCT Pub. Date: Apr. 3, 2014

(65) Prior Publication Data
US 2015/0230500 A1    Aug. 20, 2015

Related U.S. Application Data

(60) Provisional application No. 61/706,475, filed on Sep. 27, 2012.

(51) Int. Cl.
*A21D 10/04* (2006.01)
*A23P 20/10* (2016.01)
(Continued)

(52) U.S. Cl.
CPC ............ *A23L 29/262* (2016.08); *A21D 10/04* (2013.01); *A23L 19/18* (2016.08); *A23P 20/105* (2016.08); *A23P 20/12* (2016.08); *A23V 2002/00* (2013.01)

(58) Field of Classification Search
None
See application file for complete search history.

(56) References Cited

U.S. PATENT DOCUMENTS 5,281,584 A * 1/1994 Tobey .................... A21D 2/188
424/439
6,320,043 B1   11/2001 Weber et al.
(Continued)

FOREIGN PATENT DOCUMENTS

EP     2253217 A2   11/2010
WO    9316598 A1    9/1993
(Continued)

OTHER PUBLICATIONS

A Course on Image Analysis of Particles, Scientific Industrial Consulting Office, 2011, XP55091338.
(Continued)

*Primary Examiner* — D. Lawrence Tarazano
*Assistant Examiner* — Stephanie A Cox
(74) *Attorney, Agent, or Firm* — Ballard Spahr LLP

(57) ABSTRACT

An edible composition comprising starch and cellulose ether particles, wherein the cellulose ether particles have a median Equivalent Projected Circle Diameter (EQPC 50,3) of up to 110 micrometers and a Crystallinity Index, CI, of not more than 0.43, wherein $CI=(I_{200}-1_{am})/I_{200}>$ where $I_{200}$ is the intensity of the highest peak in the X-ray diffraction spectral pattern of the cellulose ether particles and $I_{am}$ is the intensity of the valley between the highest peak $I_{200}$ and the higher of the one or two peaks adjacent to the highest peak, is useful for preparing battered foods of reduced oil and/or fat uptake when fried.

18 Claims, 1 Drawing Sheet

(51) Int. Cl.
  *A23L 29/262*  (2016.01)
  *A23P 20/12*  (2016.01)
  *A23L 19/18*  (2016.01)

(56)  References Cited

U.S. PATENT DOCUMENTS 7,259,257 B2     8/2007  Schlesiger et al.
2010/0291272 A1* 11/2010 Steffens .................. A23L 1/005
                                                    426/302

FOREIGN PATENT DOCUMENTS

| WO | 2010135272 | A1 | 11/2010 |
| WO | 2012015400 | A1 | 2/2012 |
| WO | 2012138529 | A1 | 10/2012 |
| WO | 2012138532 | A2 | 10/2012 |

OTHER PUBLICATIONS

Comparison of Laser Diffraction and Image Analysis, Partec 2007, Koehler et al.
J. of Pharma. Sc., 100, No. 1, 2011, pp. 284-292, Prediction of Bulk Powder Flow Performance Using Comprehensive Particle Size and Particle Shape Distributions, Yu et al.
Food Bioprocess Technol. 5, 2012, pp. 601-608, Effect of Hydroxypropyl Methylcellulose on Rheological Properties, Amboon et al.
Text. Res. Journal, 1959, 29, 786, An Empirical Method for Estimating the Degree of Crysallinity of Native Cellulose, Segal et al.
Ma et al., Determination Methods for Dystallinity of Cellulose, Paper Science & Technology, vol. 31, No. 2, pp. 75-78, 2012.

* cited by examiner

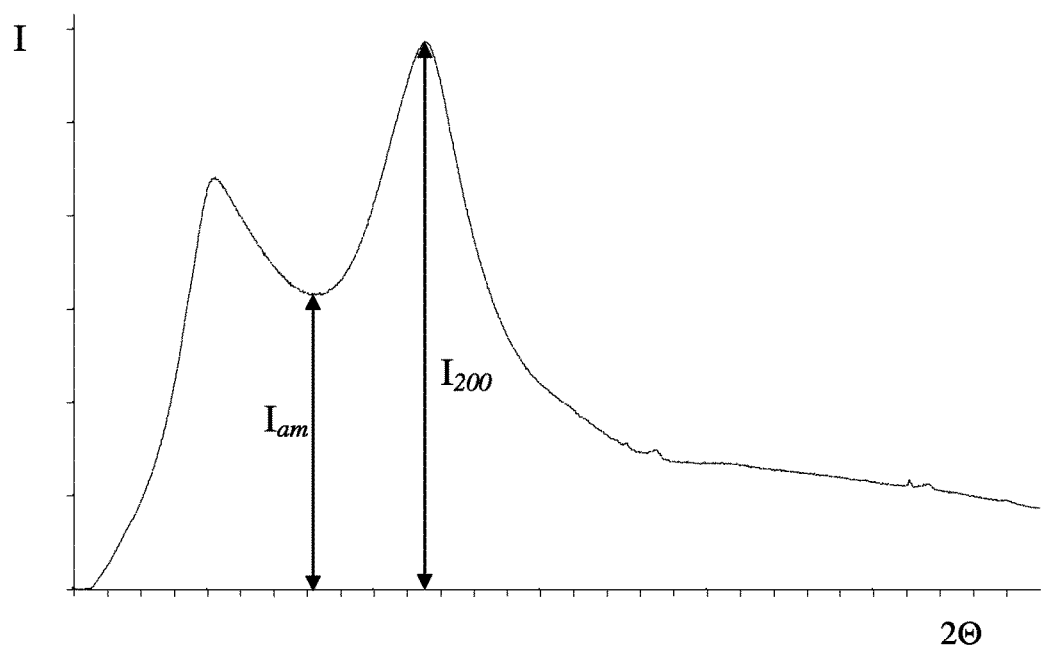

METHODS FOR REDUCING OIL AND/OR FAT UPTAKE OF FRIED FOODS

FIELD

The present application relates to an edible starch-containing composition, to methods for reducing oil and/or fat uptake of fried foods and to cellulose ether particles useful in such compositions and methods.

BACKGROUND

Fried foods commonly designates foods which are fried, typically deep-fried in oil, and includes food which is battered and fried, such as croquettes (a small cake of minced food, such as poultry, fish, mushroom, fruit or vegetables including potatoes, or cereals that is usually coated with bread crumbs or a layer of wheat flour and fried in deep fat), battered and fried vegetables, fish or meat like poultry, as well as food which is produced by kneading dough ingredients such as wheat flour, shaping the dough composition, and frying the shaped dough composition. Examples of the latter food include doughnuts, fried bread, fried noodles, and the like. Fried foods are widely consumed in many countries but considered unhealthy due to their high fat content. Therefore, much effort is spent by the skilled artisans to reduce the fat content of fried foods.

Cellulose ethers are known for their ability to reduce oil uptake of fried foods. European Patent Application EP 2 253 217 relates to a dough composition which comprises at least an aqueous solution of a water-soluble cellulose ether which is gelable during heating, and cereal crop powder. The water-soluble cellulose ether is methylcellulose, hydroxypropyl methylcellulose, hydroxyethyl methylcellulose or hydroxyethyl ethylcellulose. When deep-frying dough prepared from such composition, the oil uptake of the dough is reduced, as compared to dough that does not comprise a water-soluble cellulose ether.

The International Patent Application WO 2010/135272 teaches a further improvement of the use of cellulose ethers for reducing oil uptake of fried foods. WO 2010/135272 discloses a dry batter mix which comprises flour, at least one seasoning, optionally a leavening agent, and granulated or agglomerated methylcellulose or hydroxypropyl methylcellulose. Carboxymethyl cellulose serves as a binder for agglomerating the methylcellulose or hydroxypropyl methylcellulose. A batter is produced by the addition of water. The batter is contacted with food to prepare battered food and the battered food is fried. Battered and fried food wherein the batter comprises agglomerated methylcellulose exhibits about 10% less oil uptake than comparable battered and fried food wherein the batter comprises non-agglomerated methylcellulose.

In view of the known huge health risks caused by overconsumption of oils and fats, there is a long-felt need to find further methods of reducing the oil uptake of fried foods. One object of the present invention is to find a method which does not require a step of agglomerating methylcellulose or hydroxypropyl methylcellulose with carboxymethyl cellulose. A preferred object of the present invention is to find a method which even further reduces the oil uptake of fried foods than the methods disclosed in the prior art.

Surprisingly, it has been found that the oil uptake of fried foods can be substantially reduced if the foods to be fried are battered with a composition comprising cellulose ether particles of specific physical properties or if cellulose ether particles of specific physical properties are directly incorporated into food compositions, such as croquettes, to be fried.

SUMMARY

One aspect of the present invention is an edible composition which comprises starch and cellulose ether particles, wherein the cellulose ether particles have a median Equivalent Projected Circle Diameter (EQPC 50,3) of up to 100 micrometers and a Crystallinity Index, CI, of not more than 0.43, wherein $CI=(I_{200}-I_{am})/I_{200}$, where $I_{200}$ is the intensity of the highest peak in the X-ray diffraction spectral pattern of the cellulose ether particles and $I_{am}$ is the intensity of the valley between the highest peak $I_{200}$ and the higher of the one or two peaks adjacent to the highest peak.

Another aspect of the present invention is a method for preparing a battered food, wherein the method comprises the steps of adding water to the above-mentioned edible composition to form a batter, and contacting a food with the batter to prepare a battered food.

Yet another aspect of the present invention is a method for preparing a shaped starch-containing food preparation, wherein the method comprises the steps of incorporating the cellulose ether particles described above in a starch-containing food preparation, and shaping the food preparation.

Yet another aspect of the present invention is a method for reducing oil and/or fat uptake of a fried food, wherein the method comprises the steps of adding water to the above-mentioned edible composition to form a batter, contacting a food with the batter to prepare a battered food; and frying the battered food.

Yet another aspect of the present invention is a method for reducing oil and/or fat uptake of a fried starch-containing food preparation, wherein the method comprises the steps of incorporating the cellulose ether particles described above in a starch-containing food preparation, shaping the food preparation and frying the shaped food preparation.

Yet another aspect of the present invention are cellulose ether particles which have a median Equivalent Projected Circle Diameter (EQPC 50,3) of not more than 110 micrometers and a Crystallinity Index, CI, of not more than 0.43, wherein $CI=(I_{200}-I_{am})/I_{200}$, where $I_{200}$ is the intensity of the highest peak in the X-ray diffraction spectral pattern of the cellulose ether particles and $I_{am}$ is the intensity of the valley between the highest peak $I_{200}$ and the higher of the one or two peaks adjacent to the highest peak.

BRIEF DESCRIPTION OF DRAWINGS

FIG. 1 is a schematic representation of an X-ray diffraction spectral pattern of cellulose ether particles.

DESCRIPTION OF EMBODIMENTS

It has been surprisingly found that the novel cellulose ether particles described below are highly suitable for reducing oil and/or fat uptake of fried food including food preparations.

The cellulose ether according to the present invention has a cellulose backbone having β-1,4 glycosidically bound D-glucopyranose repeating units, designated as anhydroglucose units in the context of this invention.

Useful cellulose ethers are, for example, carboxy-$C_1$-$C_3$-alkyl celluloses, such as carboxymethyl celluloses; or carboxy-$C_1$-$C_3$-alkyl hydroxy-$C_1$-$C_3$-alkyl celluloses, such as carboxymethyl hydroxyethyl celluloses. If these cellulose ethers are used, they are preferably used in combination with an alkylcellulose, hydroxyalkyl cellulose or hydroxyalkyl alkylcellulose.

The cellulose ether preferably is an alkylcellulose, hydroxyalkyl cellulose or hydroxyalkyl alkylcellulose. This means that in the cellulose ether of the present invention, at least a part of the hydroxyl groups of the anhydroglucose units are substituted by alkoxyl groups or hydroxyalkoxyl groups or a combination of alkoxyl and hydroxyalkoxyl groups. Typically one or two kinds of hydroxyalkoxyl groups are present in the cellulose ether. Preferably a single kind of hydroxyalkoxyl group, more preferably hydroxypropoxyl, is present.

Preferred alkylcelluloses are methylcelluloses. Preferred alkyl hydroxyalkyl celluloses including mixed alkyl hydroxyalkyl celluloses are hydroxyalkyl methylcelluloses, such as hydroxyethyl methylcelluloses, hydroxypropyl methylcelluloses or hydroxybutyl methylcelluloses; or hydroxyalkyl ethylcelluloses, such as hydroxypropyl ethylcelluloses, ethyl hydroxyethyl celluloses, ethyl hydroxypropyl celluloses or ethyl hydroxybutyl celluloses; or ethyl hydroxypropyl methylcelluloses, ethyl hydroxyethyl methylcelluloses, hydroxyethyl hydroxypropyl methylcelluloses or alkoxy hydroxyethyl hydroxypropyl celluloses, the alkoxy group being straight-chain or branched and containing 2 to 8 carbon atoms. Preferred hydroxyalkyl celluloses are hydroxyethyl celluloses, hydroxypropyl celluloses or hydroxybutyl celluloses; or mixed hydroxyalkyl celluloses, such as hydroxyethyl hydroxypropyl celluloses.

Particularly preferred cellulose ethers are those having a thermal flocculation point in water, such as, for example, methylcelluloses, hydroxypropyl methylcelluloses, hydroxyethyl methylcelluloses, ethylhydroxy ethylcelluloses, and hydroxypropyl celluloses. The cellulose ethers are preferably water-soluble, i.e., they have a solubility in water of at least 1 gram, more preferably at least 2 grams, and most preferably at least 5 grams in 100 grams of distilled water at 25° C. and 1 atmosphere.

Preferred are hydroxyalkyl alkylcelluloses, more preferred are hydroxyalkyl methylcelluloses and most preferred are hydroxypropyl methylcelluloses, which have an MS(hydroxyalkoxyl) and a DS(alkoxyl) described below. The degree of the substitution of hydroxyl groups of the anhydroglucose units by hydroxyalkoxyl groups is expressed by the molar substitution of hydroxyalkoxyl groups, the MS(hydroxyalkoxyl). The MS(hydroxyalkoxyl) is the average number of moles of hydroxyalkoxyl groups per anhydroglucose unit in the cellulose ether. It is to be understood that during the hydroxyalkylation reaction the hydroxyl group of a hydroxyalkoxyl group bound to the cellulose backbone can be further etherified by an alkylation agent, e.g. a methylation agent, and/or a hydroxyalkylation agent. Multiple subsequent hydroxyalkylation etherification reactions with respect to the same carbon atom position of an anhydroglucose unit yields a side chain, wherein multiple hydroxyalkoxyl groups are covalently bound to each other by ether bonds, each side chain as a whole forming a hydroxyalkoxyl substituent to the cellulose backbone. The term "hydroxyalkoxyl groups" thus has to be interpreted in the context of the MS(hydroxyalkoxyl) as referring to the hydroxyalkoxyl groups as the constituting units of hydroxyalkoxyl substituents, which either comprise a single hydroxyalkoxyl group or a side chain as outlined above, wherein two or more hydroxyalkoxy units are covalently bound to each other by ether bonding. Within this definition it is not important whether the terminal hydroxyl group of a hydroxyalkoxyl substituent is further alkylated, e.g. methylated, or not; both alkylated and non-alkylated hydroxyalkoxyl substituents are included for the determination of MS(hydroxyalkoxyl).

The hydroxyalkyl alkylcelluloses of the invention generally has a molar substitution of hydroxyalkoxyl groups in the range of 0.05 to 1.00, preferably 0.08 to 0.90, more preferably 0.12 to 0.70, most preferably 0.15 to 0.60, and particularly 0.20 to 0.50. The average number of hydroxyl groups substituted by alkoxyl groups, such as methoxyl groups, per anhydroglucose unit, is designated as the degree of substitution of alkoxyl groups, DS(alkoxyl). In the above-given definition of DS, the term "hydroxyl groups substituted by alkoxyl groups" is to be construed within the present invention to include not only alkylated hydroxyl groups directly bound to the carbon atoms of the cellulose backbone, but also alkylated hydroxyl groups of hydroxyalkoxyl substituents bound to the cellulose backbone. The hydroxyalkyl alkylcelluloses according to this invention preferably have a DS(alkoxyl) in the range of 1.0 to 2.5, more preferably 1.1 to 2.4, most preferably 1.2 to 2.2 and particularly 1.6 to 2.05. Most preferably the cellulose ether is a hydroxypropyl methylcellulose or hydroxyethyl methylcellulose having a DS(methoxyl) within the ranges indicated above for DS(alkoxyl) and an MS(hydroxypropoxyl) or an MS(hydroxyethoxyl) within the ranges indicated above for MS(hydroxyalkoxyl). The degree of substitution of alkoxyl groups and the molar substitution of hydroxyalkoxyl groups can be determined by Zeisel cleavage of the cellulose ether with hydrogen iodide and subsequent quantitative gas chromatographic analysis (G. Bartelmus and R. Ketterer, Z. Anal. Chem., 286 (1977) 161-190).

The most preferred cellulose ether is methylcellulose. The average number of hydroxyl groups substituted by methoxyl groups per anhydroglucose unit is designated as the degree of substitution of methoxyl groups (DS). The methylcellulose preferably has a DS of from 1.20 to 2.25, more preferably from 1.25 to 2.20, and most preferably from 1.40 to 2.10. The determination of the % methoxyl in methylcellulose is carried out according to the United States Pharmacopeia (USP 34). The values obtained are % methoxyl. These are subsequently converted into degree of substitution (DS) for methoxyl substituents. Residual amounts of salt have been taken into account in the conversion. A grade of methylcellulose that is available under the tradename METHOCEL SG or SGA (The Dow Chemical Company) is particularly preferred as a starting material for preparing the methylcelluloses of the present invention according to processes described further below.

The viscosity of a cellulose ether of the present invention, such as an alkyl cellulose (like a methylcellulose), a hydroxyalkyl cellulose or a hydroxyalkyl alkylcellulose (like a hydroxyalkyl methylcellulose) is preferably from 50 to 10,000 mPa·s, more preferably from 200 to 7,000 mPa·s, most preferably from 400 to 1,000 mPa·s, and particularly from 450 to 750 mPa·s when measured as a 2 wt.-% solution in water at 25° C. using a Brookfield LV viscometer at 10 rpm with spindle LV-1.

The novel cellulose ether particles have a Crystallinity Index, CI, of not more than 0.43, wherein $CI=(I_{200}-I_{am})/I_{200}$, where $I_{200}$ is the intensity of the highest peak in the X-ray diffraction spectral pattern of the cellulose ether particles and $I_{am}$ is the intensity of the valley between the highest peak $I_{200}$ and the higher of the one or two peaks adjacent to the highest peak. The CI preferably is up to 0.40, more preferably up to 0.35, most preferably up to 0.30, and particularly up to 0.25. The CI typically is 0.05 or more, more typically 0.08 or more, and most typically 0.10 or more.

The Crystallinity Index, CI, is a parameter used to describe the relative amount of crystalline material in cellulosic materials. The principle of using X-ray diffraction for determining the degree of Crystallinity in cellulose is described by L. Segal et al. in "An Empirical Method for Estimating the Degree of Crystallinity of Native Cellulose Using the X-Ray Diffractometer", *Textile Research Journal* 1959; 29; 786. FIG. 1 is a schematic representation of an X-ray diffraction spectral pattern of cellulose ether particles, such as methylcellulose particles. It should be noted that FIG. 1 is only a schematic representation and does not represent a true scale. Nothing should be interpreted into the height of $I_{200}$ and $I_{am}$ in FIG. 1.

The Crystallinity Index, CI, is determined using a Bruker D8 Advance θ-θ X-ray diffractometer equipped with a cobalt sealed-source tube and Vantec-1 linear position sensitive detector to collect diffraction patterns on the cellulose ether particles. The tube is operated at 30 kV and 50 mA and the cellulose ether particles are illuminated with cobalt Kα radiation (α=1.7889 Å). XRD data are collected with a 6° detector window from 2° to 60° 2θ, with a step size of 0.0426° and 3 s/step collection times. Analysis of the resulting X-ray diffraction spectral patterns is performed using JADE X-ray pattern analysis software V9.3.

Moreover, the novel cellulose ether particles have a median Equivalent Projected Circle Diameter (EQPC 50,3) of up 110 micrometers, preferably up 95 micrometers, more preferably up to 80 micrometers, most preferably up to 72 micrometers, and in the most preferred embodiment up to 65 micrometers. Generally the EQPC 50,3 is 10 micrometers or more, typically 20 micrometers or more, more typically 30 micrometers or more, and most typically 40 micrometers or more. The EQPC of a particle is defined as the diameter of a circle that has the same area as the projection area of the particle. All particle size distributions, e.g., the EQPC, can be displayed and applied as number (0), length (1), area (2) and volume (3) distribution. For the purpose of the present invention the median EQPC is the volume distribution average of all particles in a given sample of a particulate cellulose ether, designated as EQPC 50,3. The volume distribution is designated by the number 3 after the comma. The median EQPC means that 50% of the particles in the particle size distribution have an EQPC that is smaller than the given value in µm (micrometers) and 50% of the particles have an EQPC that is larger. The designation 50 reflects the median value.

The EQPC 50,3 of particles can be determined using a high speed image analysis method which combines particle size and shape analysis of sample images. An image analysis method for complex powders is described in: W. Witt, U. Köhler, J. List, Current Limits of Particle Size and Shape Analysis with High Speed Image Analysis, PARTEC 2007. A high speed image analysis system is commercially available from Sympatec GmbH, Clausthal-Zellerfeld, Germany as dynamic image analysis (DIA) system QICPIC™ Use of a Dynamic Image Analysis DIA system QICPIC™ equipped with a RODOS dry powder disperser from Sympatec GmbH, Clausthal-Zellerfeld, Germany for a variety of powders is described in: W. Yu, K. Muteki, L. Zhang, and G. Kim, Prediction of Bulk Powder Flow Performance Using Comprehensive Particle Size and Particle Shape Distributions, JOURNAL OF PHARMACEUTICAL SCIENCES, VOL. 100, NO. 1, JANUARY 2011.

The high speed image analysis system is useful for measuring and calculating a number of dimensional parameters of particles. Some of these parameters are listed below.

LEFI: The particle length LEFI is defined as the longest direct path that connects the ends of the particle within the contour of the particle. "Direct" means without loops or branches.

DIFI: The particle diameter DIFI is defined as the projection area of the particle divided by the sum of all lengths of the branches of the particle.

Elongation: The particle elongation is the ratio of the diameter DIFI and the length LEFI of a particle, as defined by the formula DIFI/LEFI.

EQPC: EQPC of a particle is defined as the diameter of a circle that has the same area as the projection area of the particle.

Feret Diameter: Feret Diameter is also known as the caliper diameter. The distance between two tangents on opposite sides of a particle profile, that are parallel to some fixed direction, is the Feret Diameter. If a particle has an irregular shape, the Feret diameter usually varies much more than with regularly shaped particles.

Minimal Feret Diameter (Fmin): The minimum distance between pairs of tangents to the particle projection in some fixed direction. The minimal Feret diameter is the smallest diameter after consideration of all possible orientations (from 0° to 180°). For irregularly shaped particle, Fmin can be significantly smaller than EQPC.

Maximal Feret Diameter (Fmax): The maximum distance between pairs of tangents to the particle projection in some fixed direction. The maximal Feret diameter is the largest diameter after consideration of all possible orientations (from 0° to 180°). Fmax can be significantly larger than EQPC.

Aspect ratio: The aspect ratio of a particle in the powder is the ratio of minimal to the maximal Feret diameter, Fmin/Fmax, and is another measure for the particle shape. Fmin/Fmax is between 0 and 1 for any particle.

Sphericity: The ratio of the perimeter of a circle that has the same area as the projection area of the particle, $P_{EQPC}$, to the perimeter of the real particle. Since the equivalent circle gives the smallest possible perimeter at a given projection area, the value of sphericity is between 0 and 1 for any particle. The smaller the value, the more irregular the shape of the particle.

Number volume mean, $M_{3,0}$, and number surface area mean, $M_{2,0}$: The moments of a particle size distribution (PSD) is a standard method for characterizing physical properties of solid particles. The general definition of a moment of a PSD is given by: ISO 9276, Part 2, Calculation of average particle sizes/diameters and moments from particle size distributions.

According to Jonasz M. 2006, Moments of particle size distribution (www.tpdsci.com/Tpc/PsdMom.php), In: *Top. Part. Disp. Sci.* (www.tpdsci.com), an r-th cumulative moment, $M_r$, of the particle size distribution (PSD), n(D) is defined by the following equation: $M_r = \int_0^\infty D^r n(D) dD$. The 0-th moment, $M_0$, is the total particle number. The second and the third moment, $M_2$ and $M_3$, represent the total surface and the total volume of the particle sample. $M_{3,0}$ is the number volume mean and $M_{2,0}$ is the number surface area mean of the cellulose ether particles.

The cellulose ether particles preferably have a ratio $M_{3,0}/M_{2,0}$ of not more than 200 micrometers, preferably not more than 180 micrometers, more preferably not more than 170 micrometers, most preferably not more than 155 micrometers. The cellulose ether particles generally have a ratio $M_{3,0}/M_{2,0}$ of at least 15 micrometers, typically at least 25 micrometers, more typically at least 35 micrometers and most typically at least 45 micrometers.

The volume of fine particles and fibrous particles in a powder sample is calculated from the median of the number distribution of the respective EQPC for fine particles and from the medians of the number distributions of the respective LEFI and DIFI for fibrous particles. Number distributions are calculated from the EQPC, DIFI and LEFI for each particle within the sample.

Fine Particles:

For the purpose of the present invention fine particles have a particle length LEFI of less than 40 micrometers and generally a particle length LEFI of at least 10 micrometers. The detection limit of the Dynamic Image Analysis DIA system QICPIC™ with a M7 optical system is 10 micrometers.

The volume of the fine particles in a given sample of a cellulose ether is calculated according to Equation 1

$$V = \frac{\pi (EQPC)^3}{6} n,  \quad \text{(Equation 1)}$$

wherein V is the volume of fine particles, n is the number of fine particles in the sample and EQPC here is the median EQPC determined from the number particle size distribution of the fine particles.

Fibrous Particles

Fibrous particles, as generally understood by the skilled artisan, are typically particles characterized by irregular shape and length typically much larger than the diameter. Fibers can be straight or curved, thin or thick. Consequently, both shape and size information from the QICPIC™ is used to define the fibrous particles. For the purpose of the present invention particles are "fibrous" particles if they meet one of the following definitions I or II: I) particles with an elongation equal or less than 0.35, an aspect ratio of equal or less than 0.45, and a LEFI of equal or greater than 40 micrometers; or II) particles with an elongation equal or less than 0.35, an aspect ratio of greater than 0.45, a sphericity of less than 0.7 and a LEFI of equal or greater than 40 micrometers.

The volume of fibrous particles in a given sample of a cellulose ether can be calculated according to Equation 2

$$Vf = \frac{\pi}{4} (DIFI)^2 LEFI \, n_f,  \quad \text{(Equation 2)}$$

wherein $V_f$ is the volume of fibrous particles, $n_f$ is the number of fibrous particles in the sample, DIFI is the median projection area of the particles divided by the sum of all lengths of the branches of the particles determined from the number particle size distribution of the fibrous particles and LEFI is the median particle length determined from the number particle size distribution of the fibrous particles.

The volume fraction of the fine particles is $V/V_{tot}$, and the volume fraction of the fibrous particles is $V_f/V_{tot}$, wherein V and $V_f$ are the volumes of the fine particles and of the fibrous particles, as calculated above, and $V_{tot}$ is the total volume of the given sample of a cellulose ether. Since the densities of an individual fine particle and of an individual fibrous particle are essentially the same, the volume fractions essentially correspond to the weight fractions.

Preferably the cellulose ether particles of the present invention have a volume fraction of fine particles of at least 7%, preferably at least 10%, more preferably at least 12% and most preferably at least 15%, based on the total volume of the cellulose ether particles. Typically the volume fraction of fine particles is up to 75%, more typically up to 60% and most typically up to 50%, based on the total volume of the cellulose ether particles.

The cellulose ether particles of the present invention preferably have a volume fraction of fibrous particles of no more than 40%, more preferably no more than 30% and most preferably no more than 25%. Typically the cellulose ether particles of the present invention have a volume fraction of fibrous particles of one percent or more. As indicated above, the fibrous particles have a LEFI of equal or greater than 40 micrometers. The fibrous particles preferably have a median LEFI of not more that 150 micrometers. The median LEFI of fibrous particles means that 50% of the particles in the fraction of fibrous particles of the particle size distribution have a LEFI that is smaller than the given value in μm (micrometers) and 50% of the particles have a LEFI that is larger, as calculated from the number particle size distribution.

The production of cellulose ethers is generally known in the art. Typically the production process involves activating the cellulose, for example by treatment with an alkali metal hydroxide, reacting the thus treated cellulose with an etherifying agent, and washing the cellulose ether to remove by-products. After the washing step the cellulose ether generally has a moisture content of from 30 to 60 percent, typically from 45 to 55 percent, based on the total weight of the moist cellulose ether. While the preferred washing liquor may depend on the specific type of cellulose ether, preferred washing liquors generally are water, isopropanol, acetone, methylethylketone or brine. More preferred washing liquors generally are water or brine. Cellulose ethers are generally washed at a temperature of from 20 to 120° C., preferably from 65 to 95° C. A solvent-moist, preferably a water-moist filter cake is obtained after washing and separating the cellulose ether from the washing liquor. The moist cellulose ether is usually obtained in the shape of moist granules, moist lumps and/or a moist paste.

The moist cellulose ether is extensively comminuted to cellulose ether particles of the present invention having a Crystallinity Index, CI, and a median Equivalent Projected Circle Diameter (EQPC 50,3) as described above. The type of grinding device is not very critical, provided that the desired level of grinding is achieved. For example, the moist cellulose ether can be comminuted in a device suitable for simultaneous drying and grinding. Alternatively, dried cellulose ether can be comminuted in an impact mill. The examples below describe how to prepare the cellulose ether particles of present invention. Some aspects of the comminuting processes for producing these cellulose ether particles will be described in more general terms below.

In one method for producing the cellulose ether of the present invention moist cellulose ether is subjected to a drying-grinding operation. When drying-grinding a moist cellulose ether, the temperature of the cellulose ether prior to drying-grinding has an impact on the EQPC 50,3 of the cellulose ether particles, as described in International patent application WO 2012/015400. The temperature of the cellulose ether prior to drying-grinding is preferably controlled and optionally varied or adjusted in a range of 5 to 70° C., more preferably 8 to 65° C., most preferably 10 to 60° C. If a liquid such as water is added to the cellulose ether prior to drying-grinding, the temperature of the cellulose ether prior to drying-grinding is preferably controlled and optionally varied or adjusted by controlling and optionally varying or adjusting the temperature of the added liquid and/or by feeding the cellulose ether and the liquid into a jacketed compounder and by controlling and optionally varying or adjusting the jacket temperature of the compounder. This can also be achieved without interrupting the drying-grinding process. The compounder preferably allows thorough and intense mixing. Useful compounders are, for example, granulators, kneaders, extruders, presses, or roller mills, wherein the mixture of the cellulose ether and liquid is homogenised by applying shear forces and compounding, such as a twin-screw compounder. So-called divided trough kneaders with two horizontally arranged agitator blades that engage deeply with one another and that perform a mutual stripping action, as in the case of twin-screw compounders are particularly suitable. Suitable single-shaft, continuous kneaders include the so-called Reflector® compounders, which are high performance mixers of modular construction, consisting of a multi-part, heatable and coolable mixing cylinder and a unilaterally mounted blade mixer (manufacturer: Lipp, Germany). Also suitable are so-called pinned cylinder extruders or Stiftconvert® extruders (manufacturer: Berstorff, Germany). Kneader mixers with so-called double-blade sigma stirrers (manufacturer: Linden, Germany) in a horizontal assembly are particularly suitable. A stirred vessel with a vertically arranged mixer shaft is also suitable if suitable flow baffles are mounted on the vessel wall in order to prevent the kneaded mass rotating together with the stirrer shaft, and in this way an intensive mixing action is imparted to the kneaded material (manufacturer: Bayer AG). Also suitable are double-walled mixing vessels with a planetary stirrer and inline homogeniser. The moisture content of the cellulose ether prior to drying-grinding is preferably 45 percent or more, more preferably 50 percent or more, and most preferably 55 percent or more prior to drying-grinding, based on the total weight of the moist cellulose ether. The moisture content is preferably 90 percent or less, more preferably 85 percent or less, and most preferably 82 percent or less prior to drying-grinding, based on the total weight of the moist cellulose ether. The moisture content can be determined by ASTM method D-2363-79 (reapproved 1989).

Drying-grinding is generally described in the art as drying and grinding simultaneously in one process step with one unit operation, typically an impact mill, such as an air swept impact mill. Drying is typically accomplished with a combination of hot gas and mechanical energy. Hot air is most commonly used but also hot nitrogen gas can be used. The hot gas and the wet cellulose ether stream are generally fed via separate inlets into the mill, typically hot gas from the bottom and wet cellulose ether at a side entrance via a feed screw system connected to the mill. Superheated vapor of a solvent, such as superheated steam, or a steam/inert gas mixture or a steam/air mixture can also be used as heat-transfer gas and transport gas, as described in more detail in European Patent Applications EP 0 954 536 A1 (equivalent to U.S. Pat. No. 6,320,043) and EP 1 127 910 A1 (equivalent to U.S. Pat. No. 7,259,257). Preferably the moist cellulose ether is subjected to drying-grinding in a gas-swept impact mill, preferably an air-swept impact mill, wherein the cellulose ether is subjected to an impacting and/or shearing stress. Preferred gas-swept impact mills are Ultra Rotor mills (Altenburger Maschinen Jaeckering, Germany) or Turbofiner PLM mills (PALLMANN Maschinenfabrik GmbH & Co. KG, Germany). Gas classifier mills are also useful gas-swept impact mills, for example, the Hosokawa Alpine Air Classifier mill—ZPS Circoplex Hosokawa Micron Ltd., Cheshire, England.

Moreover, the circumferential speed of the drying-grinding device also has an impact on the EQPC 50,3 of the cellulose ether particles after drying-grinding. The circumferential speed of the drying-grinding device is preferably controlled and optionally varied or adjusted in a range of 70 to 140 m/s, more preferably of 90 to 130 m/s, most preferably of 100 to 120 m/s.

In another method for producing the cellulose ether of the present invention dry cellulose ether is subjected to a grinding operation. Dry cellulose ether typically has a moisture content of less than 10 percent, more typically of less than 5 percent, based on the total weight of the cellulose ether including the moisture. Useful grinding devices are generally known in the art, such as impact mills, ball mills, roller mills, or jet mills. Container driving-type mills, such as ball mills, vibration mills, planetary mills and centrifugal fluid mills are preferred. Exemplary of the grinding media include balls, rods and tubes. The grinding media are typically made of stainless steel, alumina, zirconia, silicon carbide, silicon nitride, tungsten carbide, glass, iron, or the cellulose ether itself. Grinding for a time period from 4 to 36 hours, typically from 8 to 24 hours is generally recommended, depending on the type of mill. It has been found that a Crystallinity Index of not more than 0.43 and an EQPC 50,3 of up to 110 micrometers can be achieved by very thorough and intense grinding.

Optionally a drying-grinding operation and an additional grinding operation can be conducted in sequence.

If a given sample of cellulose ether particles still has a Crystallinity Index of more than 0.43 or an EQPC 50,3 of more than 110 micrometers after the drying-grinding operation and/or the grinding operation as described above, the chosen drying-grinding or grinding operation should be continued to extend the drying-grinding or grinding time or the cellulose ether particles should be subjected to a further grinding operation. Based on the teaching above and in the Examples below, the skilled artisan can easily determine the optimum process parameters in the drying-grinding operation and/or the grinding operation. The measurement of the EQPC 50,3 can be done on-line as in-process control.

The edible composition of the present invention comprises starch and the above-described cellulose ether particles. The starch may originate from various sources. Starch is contained in large amounts in such staple foods as potatoes, wheat, maize (corn), rice, and cassava (tapioca). Depending on the plant, starch generally contains 20 to 25% amylose and 75 to 80% amylopectin by weight. The amount of cellulose ether particles in the edible composition of the present invention preferably is from 0.1 to 10 percent, more preferably from 0.2 to 5 percent, based on the total weight of the edible composition. The amount of starch can vary over a broad range and largely depends on the type of edible composition. Generally the amount of starch is from 1 to 99 percent, typically from 10 to 95 percent, based on the total weight of the edible composition.

In one aspect the edible composition of the present invention is a dry batter mix which comprises the above-described cellulose ether particles, flour and optional additives, such as a seasoning, and/or a leavening agent. The amount of cellulose ether particles in the dry batter mix preferably is from 1 to 10 percent, more preferably from 2 to 5 percent, based on the total weight of the dry batter mix. Preferably, the flour is at least one of wheat flour, corn flour, rice flour, potato flour, tapioca flour, soy flour, oat flour, or barley flour. In one embodiment, the flour is a mixture of at least two of wheat flour, corn flour, rice flour, potato flour, tapioca flour, soy flour, oat flour, or barley flour, more preferably the flour is an approximately 1:1 mixture of wheat flour and corn flour. In an alternative embodiment, the flour is at least one of a potato, rice, or tapioca flour. Preferably the dry batter mix comprises a seasoning. Preferred seasonings are selected from the group consisting of salt, pepper, garlic, onion, cumin, paprika, herbs, allspice, annatto, basil, cilantro, coriander, cumin, chili, dill, horseradish, mace, mustard, paprika, parsley, rosemary, sage, sesame, tarragon, thyme, tumeric, and wasabi. In one embodiment, the optional leavening agent is baking powder. In some embodiments, the batter further comprises at least one of cornmeal, powdered milk, or powdered egg. The amount of ingredients in the dry batter mix is readily determined by those skilled in the art.

The dry batter mix is preferably mixed with water to prepare a batter. The batter preferably has a viscosity of up to 1000 mPa·s, more preferably from 100 to 950 mPa·s, measured at 25° C. using a Brookfield Digital Viscometer using the RV-1 and LV-1 spindle at 10 rpm.

The present invention also relates to a method for preparing a battered food, i.e. food which is coated by a batter, which comprises the steps of adding water to an above-described edible composition, specifically to a dry batter mix, to form a batter; and contacting a food with the batter to prepare a battered food.

Foods that are battered include vegetables and vegetable products (including tofu, potatoes, onions, okra, broccoli, zucchini, carrot, eggplant, and cauliflower), meat and meat products (including hot dogs and chicken), fish and fish products (including fish filets, processed fish sticks, and shrimp), mushroom, dairy products (including cheese), fruit and fruit products (including plantains), confectionary products, and combinations thereof (including products like Monte Cristo sandwiches). The foods may be raw, pre-cooked or part-cooked before coating in batter. The food may also be hot, ambient, chilled or frozen when coated.

In one embodiment, the method further comprises freezing the battered food. In another embodiment, the method further comprises baking or deep frying the battered food, optionally after par-frying and/or freezing the battered food. In the industrial food production a food is commonly provided with a batter coating and cooked or part-cooked by frying in a food factory to set the batter. Part-cooking by frying is known as "par-frying". The cooked or, usually part-cooked food is subsequently chilled or frozen and packaged for delivery to consumers. The cooked or part-cooked foods are then prepared for consumption by frying in fat and/or oil, or by oven baking.

The present invention also relates to a method for reducing oil and/or fat uptake of fried foods, which comprises the steps of preparing a battered food as described above and frying the battered food. The term "frying the battered food" includes the step of cooking or part-cooking by frying to set the batter, optionally followed by chilling or freezing, and/or a frying step before consumption. Surprisingly, it has been found that the battered food of the present invention generally exhibits at least 15% less oil and/or fat uptake than comparable unbattered foods. When incorporating the most preferred cellulose ether particles in the battered foods, the battered foods of the present invention exhibit even at least 20% less oil and/or fat uptake than comparable unbattered foods.

In another aspect the edible composition of the present invention is a starch-containing shaped food preparation, such as French fried potatoes, hash brown potatoes, croquettes, potatoes crisps, poultry nuggets, fish sticks, or onion rings, which incorporates the above-described cellulose ether particles. Preferred starch-containing shaped food preparations are potato preparations such as mashed potatoes, French fried potatoes, or hash brown potatoes, which are potato preparations in which potato pieces are pan-fried after being shredded, julienned, diced or riced. The amount of cellulose ether particles in the starch-containing food preparation preferably is from 0.1 to 1 percent, more preferably from 0.2 to 0.5 percent, based on the total weight of the starch-containing food preparation.

The present invention also relates to a method for preparing a shaped starch-containing food preparation, which comprising the steps of incorporating the above described cellulose ether particles in a starch-containing food preparation, and shaping the food preparation. In one embodiment, the method further comprises freezing the starch-containing shaped food preparation. In another embodiment, the method further comprises baking or deep frying the shaped starch-containing food preparation, optionally after par-frying and/or freezing the shaped food preparation.

The present invention also relates to a method for reducing oil and/or fat uptake of a fried starch-containing food preparation, which comprising the steps of incorporating cellulose ether particles as described above in an above-described starch-containing food preparation, shaping the food preparation and frying the shaped starch-containing food preparation. The term "frying the shaped starch-containing food preparation" includes the step of cooking or part-cooking by frying, optionally followed by chilling or freezing, and/or a frying step before consumption. Surprisingly, it has been found that the starch-containing food preparation of the present invention generally exhibits at least 15% less oil and/or fat uptake than a comparable food preparation which does not comprise cellulose ether particles. When incorporating the most preferred cellulose ether particles in the food preparation, the shaped food preparation of the present invention exhibits even at least 25% or even at least 45% less oil and/or fat uptake than a comparable food preparation which does not comprise cellulose ether particles.

Unless specified otherwise, the terms "fat", "oil" and "fat and/or oil" are used interchangeably herein to refer to edible fats and/or oils of animal or plant origin. Examples of edible oils of plant origin include sunflower oil, rapeseed oil, maize oil, peanut oil (groundnut oil), sesame oil, soybean oil, and palm oil.

Use of the terms "comprising", "comprises" and variations thereof are intended to be open-ended. Thus, elements, steps or features not expressly listed or described are not excluded. Some embodiments of the invention will now be described in detail in the following Examples.

EXAMPLES

Unless otherwise mentioned, all parts and percentages are by weight. In the Examples the following test procedures are used.

Determination of Methoxyl Content and Viscosity

The determination of % methoxyl in methylcellulose was carried out according to the United States Pharmacopeia (USP 34). The viscosity of the methylcellulose was measured as a 2 wt.-% solution in water at 25° C. using a Brookfield LV viscometer at 10 rpm with spindle LV-1.

Determination of the Crystallinity Index, CI

The Crystallinity Index was determined using a Bruker D8 Advance Powder θ X-ray Diffractometer equipped with a cobalt sealed-source tube and Vantec-1 linear position sensitive detector to collect diffraction patterns of the cellulose ether particles. The tube was operated at 30 kV and 50 mA and the samples were illuminated with cobalt Kα radiation (α=1.7889 Å). X ray diffraction, XRD, data were collected with a 6° detector window from 2° to 60° of 2θ, with a step size of 0.0426° and 3 s/step collection times. Analysis of the resulting X-ray diffraction spectral patterns was performed using JADE X-ray pattern analysis software V9.3. As mentioned above, CI=$(I_{200}-I_{am})/I_{200}$, where $I_{200}$ is the intensity of the highest peak in the X-ray diffraction spectral pattern of the cellulose ether particles and $I_{am}$ is the intensity of the valley between the highest peak $I_{200}$ and the higher of the one or two peaks adjacent to the highest peak.

Determination of the Number Volume Mean $M_{3,0}$, the Number Surface Area Mean $M_{2,0}$ and the EQPC 50,3 of the Particles, the Volume Percentages of Fine Particles and of Fibrous Particles and the Median LEFI of Fibrous Particles The cellulose ether particles were analyzed as received or after treatment according to the (comparative) examples below with a high speed image analyzer sensor QICPIC, Sympatec, Germany, with a dry disperser RODOS/L with an inner diameter of 4 mm and a dry feeder VIBRI/L and Software WINDOX5, Vers. 5.3.0 and M7 lens.

Comparative Examples A and B

The methylcellulose of Comparative Example A was a first lot of methylcellulose which was commercially available from The Dow Chemical Company under the trademark METHOCEL™ SG A7C. It had a methoxyl content of 30.1% and a viscosity of 560 mPa·s, measured as a 2 wt.-% solution in water at 25° C.

The methylcellulose of Comparative Example B was a second lot of methylcellulose which was commercially available from The Dow Chemical Company under the trademark METHOCEL™ SG A7C. It had a methoxyl content of 29.9% and a viscosity of 690 mPa·s, measured as a 2 wt.-% solution in water at 25° C.

The methylcelluloses of Comparative Examples A and B were not subjected to any treatment and were both analyzed for the Crystallinity Index, CI, and EQPC 50,3 as received.

Examples 1 and 3 and Comparative Example C: Drying-Grinding

A commercially available continuous compounder with heating and cooling jacket was used to add water to dry methylcellulose (MC) of Comparative Example A as feedstock material to adjust the moisture and the temperature of the MC to those listed in Table 1 below. The % moisture in Table 1 below is based on the total weight of the moist MC, i.e. MC including the water content. The compounder was jacketed. The compounder jacket was supplied with a fluid to provide a jacket temperature listed in Table 1 below. The cellulose ether was fed continuously at a feed rate listed in Table 1 into the compounder. The wet product was transported continuously via a transport belt into a mill feed unit (Altenburger Maschinen Jaeckering GmbH, Hamm, Germany). The bottom blades of the vessel agitator pressed the paste into a single augur screw mounted at the bottom of the vessel. The wet product was forced through a perforated plate directly into the side of an Ultrarotor II "S" gas-swept impact mill (Altenburger Maschinen Jaeckering GmbH, Hamm, Germany) between the first and second grinding stage. The mill was equipped with seven grinding stages. The bottom three grinding stages were equipped with standard grinding bars. Turbo-bars were installed in the top four grinding stages. A co-rotating finger sifter wheel with twelve blades was installed on the top of the 7th grinding stage. The interior of mill jacket had the standard Altenburger corrugated stationary grinding plates.

The rotor of the impact mill was operated at a circumferential speed as listed in Table 1 below. A nitrogen stream having a temperature of 112° C. at a flow rate listed in Table 1 below was fed into the bottom of the mill. A cyclone was used to separate the dried product from the nitrogen. The final product moisture was less than 1.1-2.3% by weight.

Example 2: Drying-Grinding Followed by Roller Milling

Methylcellulose (MC) of Comparative Example A was subjected to drying-grinding operation as described for Examples 1 and 3 and Comparative Example C applying the conditions as listed in Table 1 below.

After the drying-grinding operation 50 g of the methylcellulose particles were further comminuted in a roller mill for 24 hours. The roller mill was filled with 6978.5 g of tungsten carbide balls of a diameter of 0.125 inch (3.2 mm). The mill was a steel cylinder with an inside diameter of 4.75 inches (12 cm) and an outside diameter of 5 inches (12.7 cm) with 3 internal square baffles, each 0.25 inches (0.635 cm) thick. The length of the cylinder was also 4.75 inches (12 cm). The bottom was a welded flange and the lid had a diameter of 4.24 inches (10.8 cm) with a 0.375 inch (0.953 cm) rubber gasket that was held in place with a clamp. The mill was operated at ambient temperature. The apparatus rolled on a roller device in order to be spun at 67 rpm. The methylcellulose of Example 2 obtained by this grinding operation had a CI of 0.14 and an EQPC 50,3 of 46 μm.

Example 4

2.5 kg of dry methylcellulose (MC) of Comparative Example B (having a CI of 0.47 and an EQPC 50,3 of 89 μm) was subjected to ball mill grinding for 18 hours in a Patterson ball mill having a diameter of 15 inches (38 cm) and a length of 21 inches (53.3 cm). The ball mill was filled with 100 kg of carbon steel balls of a diameter of 1 inch (25.4 mm). The mill was cooled with tap water. The methylcellulose of Example 4 obtained by this grinding operation had a Crystallinity Index of 0.19 and an EQPC 50,3 of 45 μm.

Examples 5-7

Methylcellulose of Comparative Example B (having a CI of 0.47 and an EQPC 50,3 of 89 μm) was subjected to grinding as in Example 4, except that the grinding times were varied. After 4 hours of grinding the Crystallinity Index, CI, was 0.43, after 7 hours of grinding the CI was 0.29, and after 27 hours of grinding the CI was 0.19.

Example 8

2.5 kg of MC of Comparative Example A (having a CI of 0.47 and an EQPC 50,3 of 86 μm) was subjected to grinding as in Example 4, except that the grinding time was 10 hours. The methylcellulose of Example 8 obtained by this grinding operation had a Crystallinity Index of 0.29 and an EQPC 50,3 of 45 μm.

Example 9

50 g of dry MC of Comparative Example A (having a CI of 0.47 and an EQPC 50,3 of 86 μm) was subjected to milling in the same roller mill as in Example 2 for 18 hours. The mill was operated at ambient temperature. The apparatus rolled on a roller device in order to be spun at 67 rpm. The methylcellulose of Example 9 obtained by this grinding operation had a Crystallinity Index of 0.19 and an EQPC 50,3 of 45 µm.

Example 10

50 g of dry MC of Comparative Example A (having a CI of 0.47 and an EQPC 50,3 of 86 µm) was subjected to milling in the same roller mill as in Example 2 for 24 hours. The mill was operated at ambient temperature. The apparatus rolled on a roller device in order to be spun at 67 rpm. The methylcellulose of Example 10 obtained by this grinding operation had a Crystallinity Index of 0.17 and an EQPC 50,3 of 43 µm.

TABLE 1

| (Comparative) Example | A | 1 | 2 | 3 | C |
|---|---|---|---|---|---|
| MC Moisture prior to dry grinding, [%] | — | 59 | 59 | 56 | 49 |
| Feed rate moist MC, [kg/h] | — | 31 | 31 | 16 | 31 |
| Jacket Temperature, [° C.] | — | 2 | 2 | 14 | −4 |
| MC Temperature prior to dry grinding, [° C.] | — | 25 | 25 | 25 | 25 |
| Gas Flow Mill, [m³/h] | — | 1394 | 1394 | 1531 | 1002 |
| Tip Speed mill, [m/s] | — | 114 | 114 | 114 | 58 |
| roller milled | No | no | yes | no | no |

TABLE 2

| (Comp.) Example | CI | EQPC 50.3 [µm] | $M_{2,0}$ [µm²] | $M_{3,0}$ [µm³] | $M_{3,0}/M_{2,0}$ [µm] | Vol. % V of fine particles | Vol. % $V_f$ of fibrous particles | Median LEFI of fibrous particles, [µm] |
|---|---|---|---|---|---|---|---|---|
| A | 0.47 | 86 | 7523 | 1788460 | 238 | 5 | 48 | 167 |
| 1 | 0.20 | 61 | 2539 | 345565 | 136 | 18 | 22 | 140 |
| 2 | 0.14 | 46 | 430 | 22774 | 53 | 43 | 2 | 83 |
| 3 | 0.39 | 60 | 3256 | 464773 | 143 | 13 | 24 | 120 |
| 8 | 0.29 | 45 | 944 | 50522 | 54 | 29 | 3 | 75 |
| 9 | 0.19 | 45 | 622 | 35648 | 57 | 38 | 3 | 76 |
| 10 | 0.17 | 43 | 474 | 24374 | 51 | 45 | 2 | 74 |
| C | 0.37 | 137 | 21040 | 6070053 | 289 | <1 | 35 | 251 |
| B | 0.47 | 89 | 8417 | 1833589 | 218 | 4 | 45 | 171 |
| 4 | 0.19 | 45 | 622 | 35648 | 57 | 38 | 3 | 76 |

Determination of Oil Uptake

Preparation of Potato Strips

Potatoes were hand-peeled, with both ends cut off. Those potatoes were cut into strips of a cross-section of 0.9 cm×0.9 cm. Uniform pieces were chosen for experiments. The strips were rinsed with water and then blanched in water at 85° C. for 5 min. After blanching, the potato strips were immersed in 0.2% citric acid solution at 95° C. for 1 min. Then all pieces were drained and dried in a conventional oven until about 10% weight loss was achieved. Potatoes were cooled down and covered with plastic wrap (SARAN™ PVdC).

Batter Coating of Potato Strips 100 parts of batter were prepared by mixing 75 parts of water with 25 parts of dry blended ingredients. The dry blend contained 11.625 parts of rice flour (Brand: Ener-G gluten-free White Rice Flour), 11.625 parts of corn starch (Brand: HYLON® VII Corn starch from National Starch), 1 part of a cellulose ether as listed in Tables 2 and 3, and 0.75 parts of salt (Brand: Morton's Iodized). Water was added to the dry blend in a mixing bowl (Kitchen Aid) with wire whisk attachment and blended at medium to high speed for about 30 seconds. The mixture from the side of the mixing bowl was scraped down and blended for another 30 seconds. The mixture was blended for an additional 11 minutes at a lower speed (slow to medium-slow). The batter mixture was then transferred to a 600 ml beaker. The batter was then transferred to a mixing bowl and mixed with 200 g of potato strips for about 15 seconds using a spatula. Batter coated potato strips were placed onto a wire rack with a plastic try underneath. Afterwards individual potato strips were transferred from one mixing rack to another using tongs. The potato strips were flipped 1-2 times to enable excess batter to run-off.

Frying Procedure

A commercial deep-fat fryer was used for the frying tests. The fryer was preheated prior to frying experiments until it reached 190° C. Batter coated potato strips were submerged in a frying basket and par-fried for 30 seconds. The frying basket was removed from the deep fryer and shaken a couple times after about 15-20 seconds. The par-fried French fries in the frying basket were removed from oil and shaken about ten times to remove the excess oil from the surface of the French fries. Then the par-fried French fries were transferred to a tared baking sheet and their final weight was recorded. Both baking sheet and French fries were placed without covering in a freezer for 10 minutes, after which these were covered with plastic wrap (SARAN™ PVdC). Once the French fries had been frozen overnight, the fryer was heated to 185° C. The baking sheet containing par-fried French fries was placed on a scale and tared. Then the French fries were placed into a submerged frying basket. The initial temperature was recorded. Finish-frying lasted about 2 minutes. The basket was shaken a couple times after about 15-20 seconds. The frying basket was removed from oil and shaken about ten times. The final temperature was recorded. The French fries were transferred to a plastic bag (Ziploc™ bag) after cooling. The French fries were frozen prior to oil analysis.

Oil Uptake Analysis

Oil content of the deep-fried potato strips (French fries) was determined on dried samples using the Soxtec extraction method applying the principles described in Official Methods of Analysis of AOAC International, AOAC Official Method 2003.05 (Crude Fat in Feeds, Cereal Grains and Forages, Randall/Soxtec/Diethylether Extraction-Submersion Method, First Action 2003, Final Action 2006). A Soxtec™ 2055 Fat Extraction System was used which is commercially available from FOSS, Denmark applying the procedure described by FOSS in Application Sub Note ASN 3171 of 2005 Mar. 1, revision 4.1. "Extraction of fat in Potato chips and Corn Snacks using Soxtec extraction systems". The solvent used for oil extraction was Petroleum Ether 35/60, ACS, which is commercially available from Alfa Aesar, a Johnson Matthey Company.

The extracted oil was calculated, based on the total weight of the French fries. In the cases where the French fries had a batter coating, the percentage of oil is based on the total weight of the French fries, including the batter and oil.

Table 3 below lists the oil content of the French fries and the oil content reduction, as compared to potato strips that were not battered but fried as described above.

TABLE 3

| Methyl-cellulose of (Comparative) Example | CI of methyl-cellulose | EQPC 50,3 of methyl-cellulose [μm] | Oil content [%] | Oil content reduction [%] |
|---|---|---|---|---|
| — Control (unbattered) | — | — | 9.76 | — |
| A | 0.47 | 86 | 8.81 | 9.7 |
| 1 | 0.20 | 61 | 7.39 | 24.3 |
| 2 | 0.14 | 46 | 7.67 | 21.4 |
| 3 | 0.39 | 69 | 8.16 | 16.4 |
| 8 | 0.29 | 45 | 8.48 | 13.1 |
| 9 | 0.19 | 45 | 7.99 | 18.1 |
| 10 | 0.17 | 43 | 7.80 | 20.1 |
| C | 0.37 | 137 | 9.38 | 3.9 |
| B | 0.47 | 89 | 8.79 | 9.9 |
| 4 | 0.19 | 45 | 7.59 | 22.2 |

The oil uptake reduction in Examples 1-4 and 8-10 and in Comparative Examples A-C was calculated according to the formula:

100×[oil content of Control−oil content in (Comp.) Ex.]/oil content of Control.

Table 3 illustrates that the cellulose ether particles of the present invention, which have a median Equivalent Projected Circle Diameter (EQPC 50,3) of not more than 110 micrometers and a Crystallinity Index, CI, of not more than 0.43, are surprisingly effective in reducing the oil uptake of fried foods. They are more effective than comparative cellulose ether particles which have an EQPC 50,3 of more than 110 micrometers (as in Comparative Example C) and/or which have a CI of more than 0.43 (as in Comparative Examples A and B).

The battered food of Comparative Example A had an oil content of 8.81%, whereas the inventive battered food of Example 1 had a total oil content of 7.39%. Accordingly, the inventive battered food of Example 1 had an oil uptake which was reduced by 16.1%, as compared to the battered food of Comparative Example A (100×[8.81−7.39]/8.81). This is highly surprising. The inventive battered food of Examples 2 and 3 had an oil uptake which was reduced by 12.9% and 7.4%, as compared to the battered food of Comparative Example A. The inventive battered food of Example 4 had an oil uptake which was reduced by 13.7%, as compared to the battered food of Comparative Example B. The inventive battered food of Example 8-10 had an oil uptake which was reduced by 3.7%, 9.3%, and 11.5% as compared to the battered food of Comparative Example A.

The invention claimed is:

1. An edible composition comprising starch and water-soluble cellulose ether particles, wherein the cellulose ether particles have a median Equivalent Projected Circle Diameter (EQPC 50,3) of up to 110 micrometers, a Crystallinity Index, CI, of not more than 0.43, the cellulose ether particles have a volume fraction of fibrous particles of no more than 40% and the fibrous cellulose ether particles have a median LEFI of not more than 150 micrometers, wherein $CI=(I_{200}-I_{am})/I_{200}$, where $I_{200}$ is the intensity of the highest peak in the X-ray diffraction spectral pattern of the cellulose ether particles and $I_{am}$ is the intensity of the valley between the highest peak $I_{200}$ and the higher of the one or two peaks adjacent to the highest peak, wherein the composition is a dry batter mix comprising from 1 to 10 percent of the cellulose ether particles, based on the total weight of the dry batter mix.

2. The composition of claim 1 wherein the cellulose ether particles have a Crystallinity Index of from 0.10 to 0.30.

3. The composition of claim 1 wherein the cellulose ether particles have a median Equivalent Projected Circle Diameter (EQPC 50,3) of not more than 80 micrometers.

4. The composition of claim 1, wherein the cellulose ether is a methylcellulose or a hydroxyalkyl methylcellulose.

5. The composition of claim 1, wherein the composition is a dry batter mix comprising at least one flour selected from the group consisting of wheat flour, corn flour, rice flour, potato flour, tapioca flour, soy flour, oat flour, and barley flour and the dry batter mix comprises from 2 to 5 percent of the cellulose ether particles, based on the total weight of the dry batter mix.

6. The composition of claim 1, wherein the composition is a shaped food preparation which incorporates the cellulose ether particles.

7. The composition of claim 1 wherein the cellulose ether particles have a Crystallinity Index of from 0.10 to 0.25 and a median Equivalent Projected Circle Diameter (EQPC 50,3) of not more than 80 micrometers and the cellulose ether is a methylcellulose or a hydroxyalkyl methylcellulose.

8. The composition of claim 1 wherein the cellulose ether particles have a volume fraction of fibrous particles of no more than 25%.

9. A method for preparing a battered food, comprising the steps of adding water to the composition of claim 1 to form a batter; and contacting a food with the batter to prepare a battered food.

10. The method of claim 9, further comprising freezing the battered food or the shaped food preparation.

11. A method for preparing a shaped starch-containing food preparation, comprising the steps of incorporating the cellulose ether particles set forth in claim 1 in a starch-containing food preparation, and shaping the food preparation.

12. A method for reducing oil and/or fat uptake of a fried food, comprising the steps of:
adding water to the composition of claim 1 to form a batter;
contacting a food with the batter to prepare a battered food; and
frying the battered food.

13. The method of claim 12, wherein the battered food exhibits at least 15% less oil and/or fat uptake than unbattered foods.

14. A method for reducing oil and/or fat uptake of a fried food preparation, comprising the steps of incorporating the cellulose ether particles set forth in claim 1 in a starch-containing food preparation, shaping the food preparation and frying the shaped food preparation.

15. Water-soluble cellulose ether particles having a median Equivalent Projected Circle Diameter (EQPC 50,3) of not more than 110 micrometers and a Crystallinity Index, CI, of not more than 0.25, the cellulose ether particles have a volume fraction of fibrous particles of no more than 40% and the fibrous cellulose ether particles have a median LEFI of not more than 150 micrometers, wherein $CI=(I_{200}-I_{am})/I_{200}$, where $I_{200}$ is the intensity of the highest peak in the X-ray diffraction spectral pattern of the cellulose ether particles and $I_{am}$ is the intensity of the valley between the highest peak $I_{200}$ and the higher of the one or two peaks adjacent to the highest peak.

16. The cellulose ether particles of claim 15 having a Crystallinity Index of from 0.10 to 0.25.

17. The cellulose ether particles of claim 16 having a median Equivalent Projected Circle Diameter (EQPC 50,3) of not more than 80 micrometers.

18. The cellulose ether particles of claim 17 having a volume fraction of fibrous particles of no more than 25%.

* * * * *